(12) United States Patent
Pimentel et al.

(10) Patent No.: US 9,839,328 B2
(45) Date of Patent: Dec. 12, 2017

(54) CUTTING BOARD ASSEMBLY

(71) Applicant: ELECTROLUX HOME PRODUCTS, INC., Charlotte, NC (US)

(72) Inventors: Nathalie Pimentel, Charlotte, NC (US); Sara Dulski, Huntersville, NC (US); David Singer, Austin, TX (US); Brian Roderman, Plano, TX (US); Justin Pendleton, The Colony, TX (US); Kevin Shin, Austin, TX (US)

(73) Assignee: Electolux Home Products, Inc., Charlotte, NC (US)

( * ) Notice: Subject to any disclaimer, the term of this patent is extended or adjusted under 35 U.S.C. 154(b) by 305 days.

(21) Appl. No.: 14/821,292

(22) Filed: Aug. 7, 2015

(65) Prior Publication Data

US 2017/0035253 A1   Feb. 9, 2017

(51) Int. Cl.
*B23Q 3/00* (2006.01)
*A47J 47/00* (2006.01)

(52) U.S. Cl.
CPC ................... *A47J 47/005* (2013.01)

(58) Field of Classification Search
CPC ......... A47J 47/005; A47J 47/08; B25B 11/00; B23Q 3/00
See application file for complete search history.

(56) References Cited

U.S. PATENT DOCUMENTS

| | | | | |
|---|---|---|---|---|
| 2,609,024 A | | 9/1952 | Russ | |
| 3,598,164 A | | 8/1971 | August | |
| 4,653,737 A | * | 3/1987 | Haskins | A47J 47/005 269/13 |
| 5,312,178 A | * | 5/1994 | King | E05B 67/383 269/289 R |
| 5,363,755 A | * | 11/1994 | Liang | A47B 77/02 241/273.2 |
| 5,366,208 A | * | 11/1994 | Benjamin | A47J 47/005 269/13 |
| 5,865,105 A | * | 2/1999 | Pepelanov | A47J 47/005 269/15 |
| 5,938,185 A | * | 8/1999 | Kletter | A47J 47/005 269/15 |
| 7,036,809 B1 | * | 5/2006 | Mitchell | A47J 47/16 269/289 R |
| 7,422,201 B2 | * | 9/2008 | Pearl | A47J 47/005 269/289 R |
| 7,442,118 B2 | | 10/2008 | Edmond | |
| 7,637,488 B2 | | 12/2009 | Zeng | |
| 7,681,871 B2 | | 3/2010 | Shew et al. | |

(Continued)

FOREIGN PATENT DOCUMENTS

EP   0832596 A1   1/1998

*Primary Examiner* — Lee D Wilson
(74) *Attorney, Agent, or Firm* — Moore & Van Allen PLLC; Peter B. Stewart (57) ABSTRACT

A cutting board includes a base tray, a cutting board top, a cutting mat and/or a cutting board, and a bin. The base tray has a first chamber and a second chamber. The cutting board top fits within a complementary shape on top of the base. The cutting mat and/or cutting board is stored in the first chamber under the cutting board top and may be later removed from this chamber and placed on the cutting board top. The bin fits within a complementary-shaped chamber in the base adjacent the cutting board top. In some configurations, the bin may include a lid.

20 Claims, 11 Drawing Sheets

(56) References Cited

U.S. PATENT DOCUMENTS

| | | | |
|---|---|---|---|
| 7,758,029 B2* | 7/2010 | Lim | A47J 47/005 269/289 R |
| 8,220,789 B2 | 7/2012 | Pourounidis et al. | |
| 9,049,964 B2 | 6/2015 | Baranoff | |
| 2005/0040580 A1* | 2/2005 | Davis | A47J 47/005 269/289 R |
| 2005/0205572 A1 | 9/2005 | Leibowitz | |
| 2008/0296823 A1* | 12/2008 | Pourounidis | A47J 47/005 269/289 R |
| 2011/0221111 A1 | 9/2011 | Stigall | |
| 2013/0313350 A1 | 11/2013 | Baranoff | |
| 2014/0042685 A1 | 2/2014 | Nordstrom | |
| 2017/0035253 A1* | 2/2017 | Pimentel | A47J 47/005 |

* cited by examiner

CUTTING BOARD ASSEMBLY

FIELD OF THE INVENTION

Various configurations of the current invention relate generally to apparatus, systems, and methods for preparing food. More particularly, the apparatus, systems and methods relate to a cutting board used to prepare food. Specifically, the apparatus, systems, and methods provide for a cutting board with multiple cutting surfaces as well as a bin for collecting cut material and/or liquids.

BACKGROUND OF THE INVENTION

A cutting board is found in almost all kitchens, both residential and commercial. They are usually stored during nonuse, typically in a cabinet drawer or closet, and taken out when needed. However, some people like the visible presence of a cutting board in the kitchen.

Cutting boards are used as a surface on which to prepare various types of foods including fruits, vegetables, meats, fish, etc. A cutting board provides a flat work surface to slice, dice, chop, pare, and otherwise process foods to their desired size, shape and/or consistency. A cutting board protects the countertop or other surface on which it is placed from damage during this processing. For those cutting boards that include a perimeter groove or channel, such groove or channel helps collect liquids and juices and/or stops those liquids and juices from spilling over the edge of the cutting board. The mobility of a cutting board helps with the disposal of wastes. Wastes that collect on a cutting board are disposed of by carrying the waste-containing cutting board to a waste bin and dumping the waste.

Most people wipe off or clean a cutting board between uses for different foods to avoid undesirable effects such as, for example, altering the taste of the foods. Especially when preparing certain types of raw foods, e.g., fish, beef, pork, and, poultry, it is important to properly clean a cutting board to remove bacteria (e.g. *salmonella, listeria*, and *Escherichia coli*), and avoid food contamination (cross-contamination) and food-borne diseases. Sometimes it is important to clean a used cutting board to protect people with food allergies. For example, people with Celiac's disease cannot have their food come in contact with other foods or utensils that have gluten, necessitating a thorough cleaning of a cutting board after use with certain foods.

Most cutting boards can be rinsed or washed either by hand or by placing them inside a dishwasher for cleaning like most other kitchen utensils. Washing and drying a cutting board, however, adds time to the food preparation process and requires at least some movement in the kitchen from the location where the cutting board is being used to the sink and/or the dishwasher. There is also a chance for improper or inadequate cleaning of the cutting board due to the washer's negligence and/or spatial limitations (e.g., the cutting board is larger than the sink and does not fit therein for cleaning). In some instances, particularly in a commercial kitchen where a clean cutting board is often needed, multiple cutting boards are utilized to decrease the amount of lost time. In some instances, storage space and counter space is limited. Accordingly, many users do not have the luxury of having multiple cutting boards in their kitchens or the extra counter and/or table surface areas on which to use multiple cutting boards. Thus, there is a need for an improved cutting board device.

SUMMARY OF THE INVENTION

One embodiment is a cutting board. The cutting board includes a base, a cutting board top, at least one cutting boardiand or cutting mat, and an optional bin. The base has a first chamber and a second chamber. The cutting board top fits within a complementary shape on top of the base. When not in use, the cutting board is stored in the first chamber under the cutting board top and may be later removed from this chamber and placed on the cutting board top. When used with an optional bin, the base has a complementary-shaped second chamber in the base adjacent the cutting board top to receive the bin. In some configurations, the bin may include an optional lid.

BRIEF DESCRIPTION OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION OF THE DRAWINGS

Figure 1:
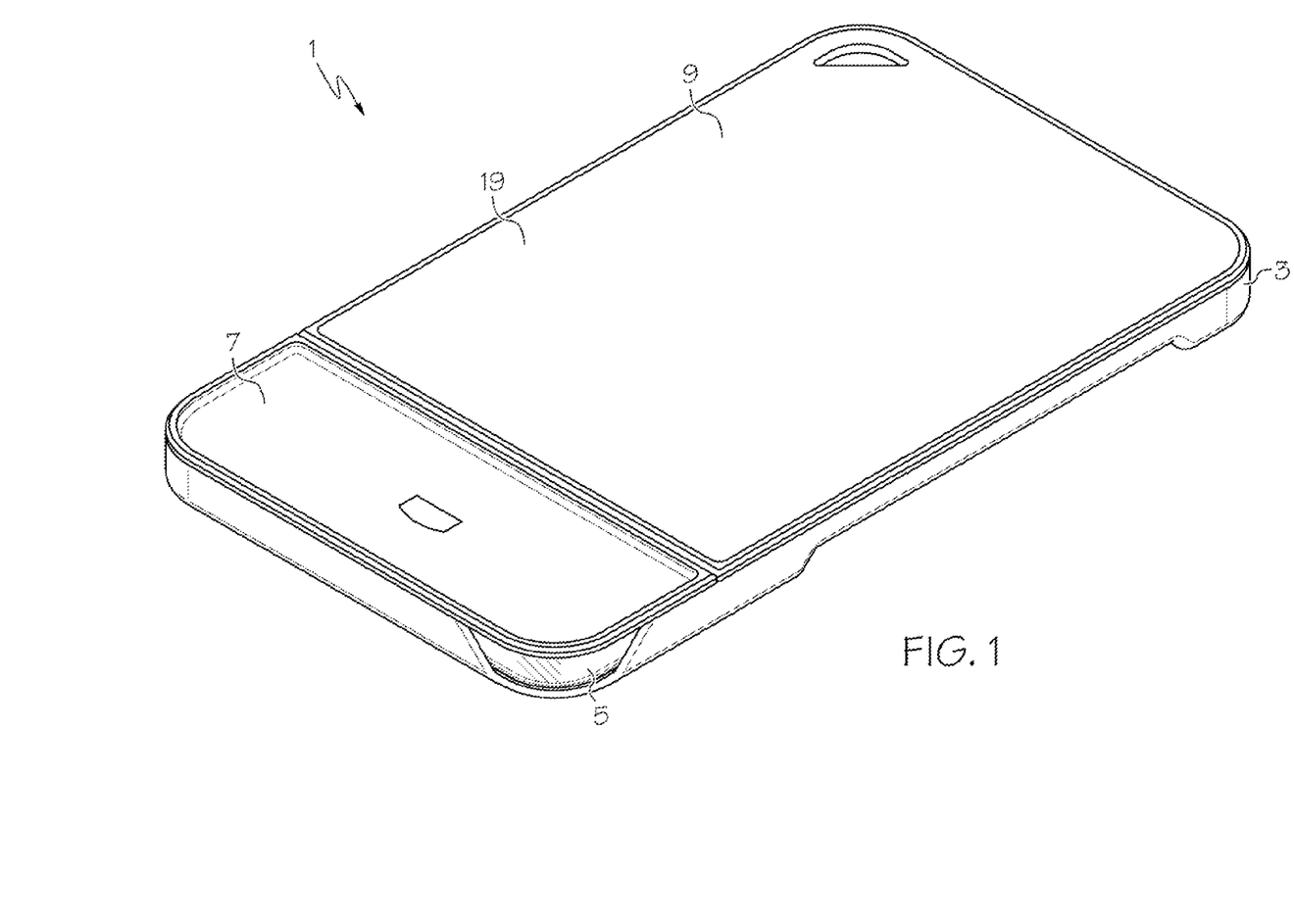
FIG. 1 illustrates a perspective view of one example embodiment of a cutting board assembly.
Figure 2:
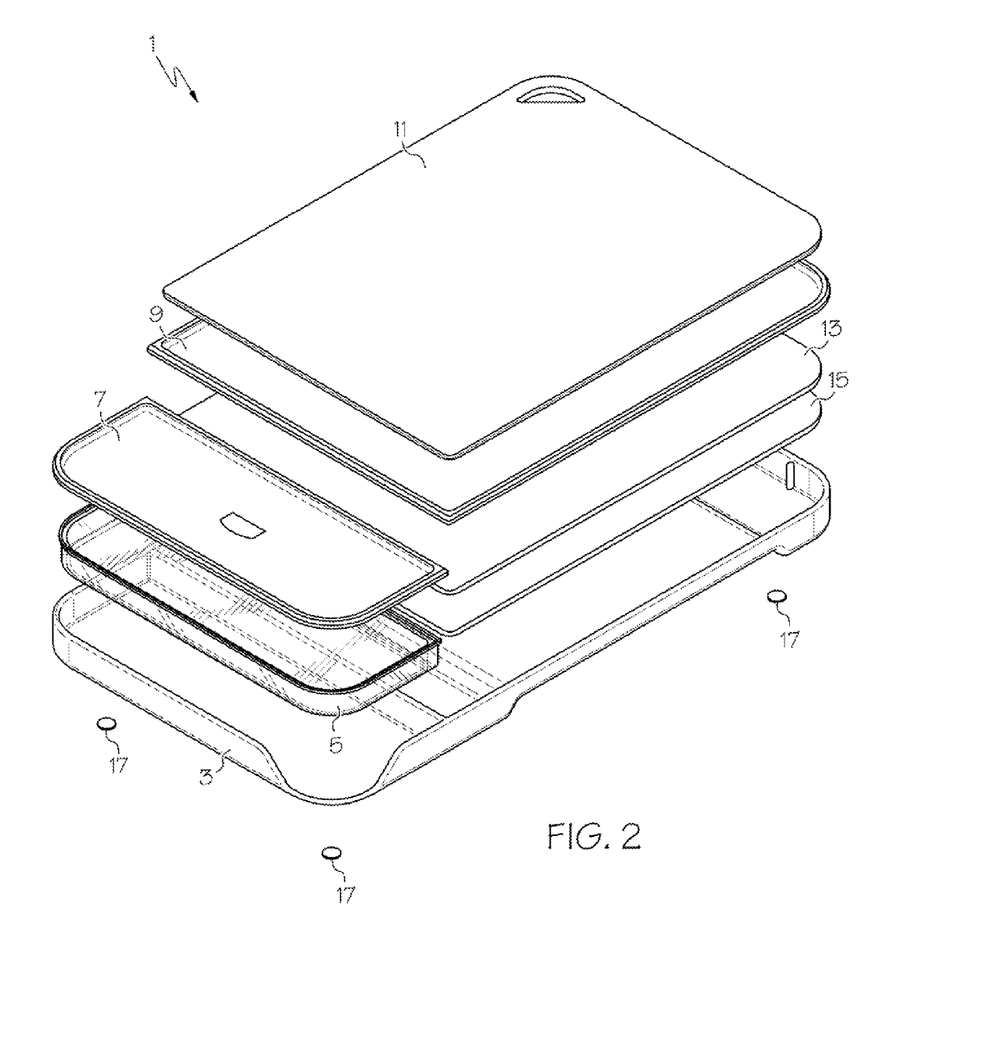
FIG. 2 illustrates an exploded view of the cutting board assembly.
Figure 3:
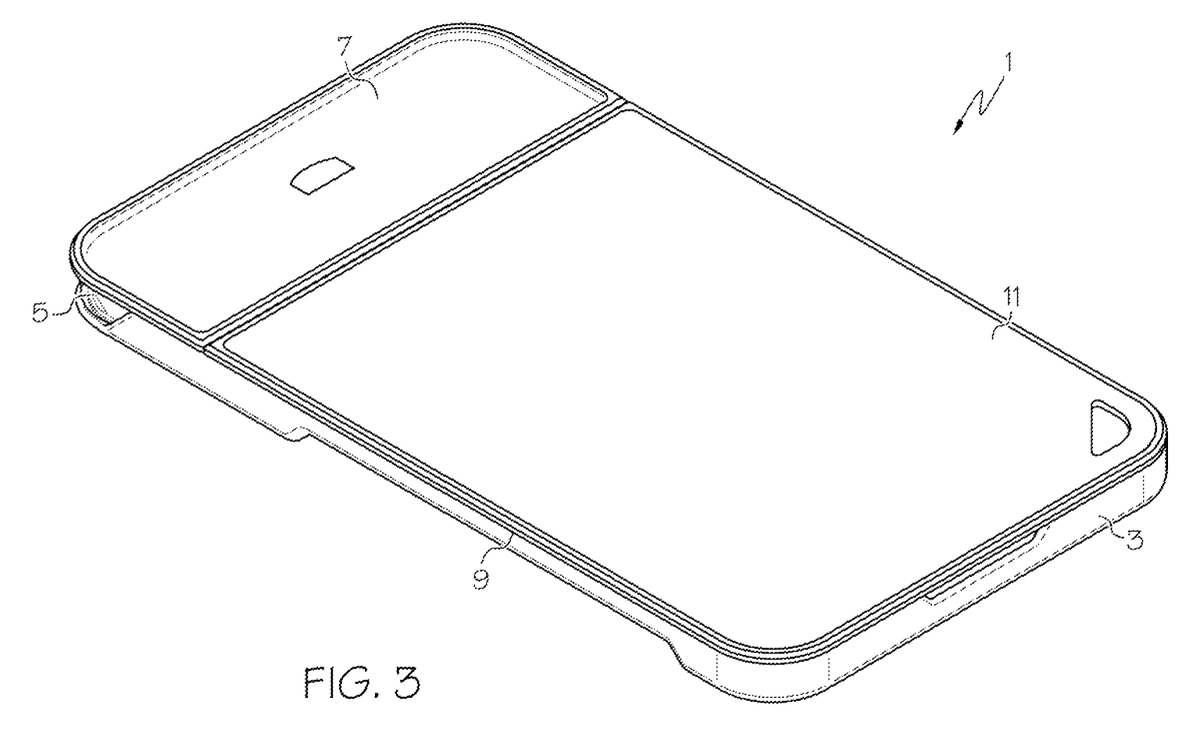
FIG. 3 illustrates another perspective view of the cutting board assembly.

A novel cutting board assembly 1 is illustrated in FIGS. 1-3. Cutting board assembly 1 includes a base tray 3 with a bin 5 that can be removed from base tray 3. Bin 5 includes a lid 7 that can be used to cover bin 5. Cutting board assembly 1 includes a removable primary cutting board top 9 as well as additional cutting boards 11, 13, and 15. While reference is made to cutting boards 11, 13, 15, it is understood that they may be cutting mats or any other type of cutting surface and in some configurations may have dual top and bottom cutting surfaces. As discussed further below, having a cutting board assembly with a cutting board top 9 as well as three cutting boards 11, 13, 15 is useful in preventing cross-contamination when preparing different food products. Bin 5 may be used to store a prepared cooking item or an item such as seasoning to be used to prepare a food using cutting board assembly 1. Alternatively, waste products can be swept from an upper surface 19 of cutting board into bin 5. Of course, if cutting boards 11, 13, or 15 were being used, then waste products from those boards may be swept from them into bin 5.

In the preferred embodiment, the components of cutting board assembly 1, are formed with rigid materials. Example rigid materials include metal steel, aluminum, plastics such as acrylonitrile-butadiene-styrene (ABS), polyethylene, and thermoplastic polyurethane (TPU) and the like. For example, base tray 3 can be formed with ABS while cutting board top 9 and the three cutting boards 11, 13, 15 may be formed with polyethylene. Bin 5 can be formed with a transparent or semitransparent polycarbonate, and its lid 7 can be formed with a flexible plastic material so that it is easy to place on and remove from bin 5. Some embodiments may include pads/feet 17 that may be placed on the bottom of base tray 3 so that cutting board assembly 1 does not slide upon a surface where it is used. As understood by those of ordinary skill in the art, the various components of cutting board assembly 1 can be made out of other suitable materials.

Figure 4A:
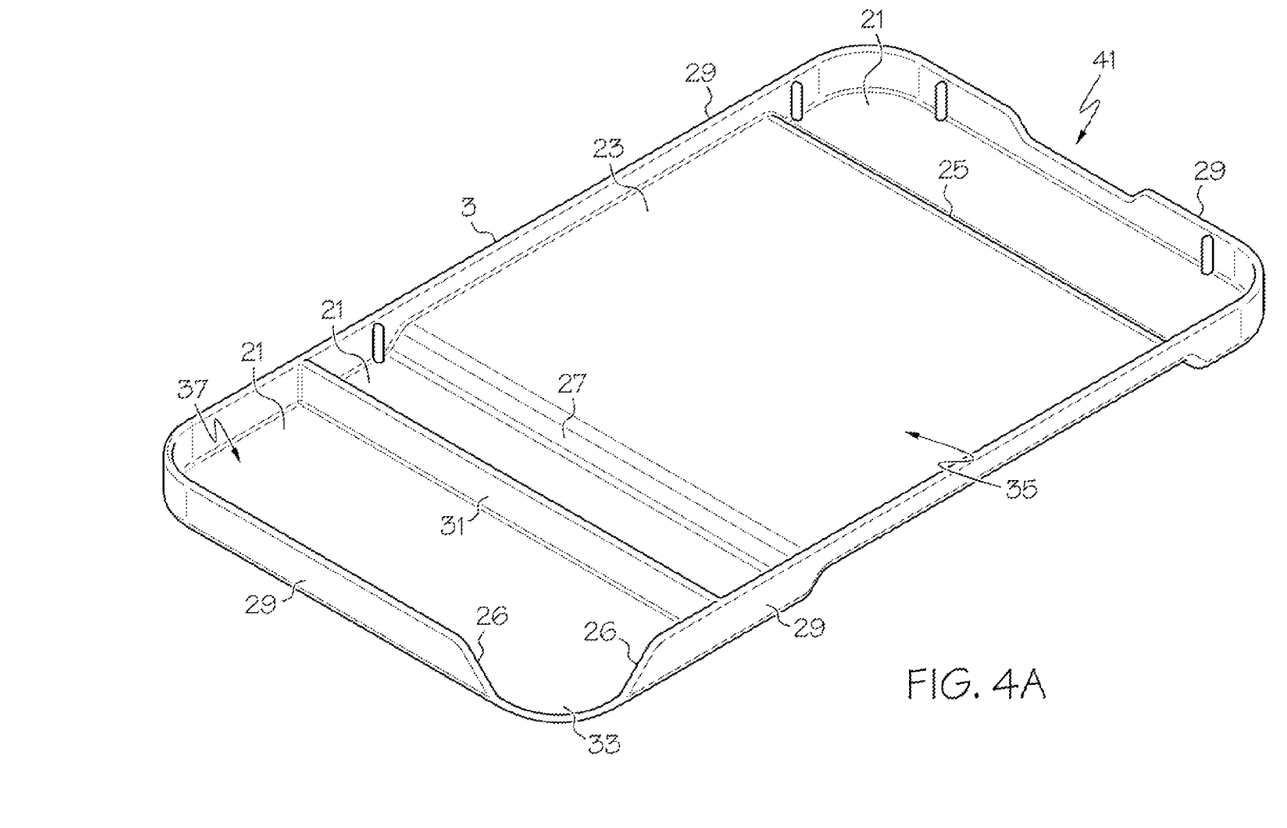
FIGS. 4A-B, respectively, illustrate a perspective view and a bottom view of a base tray of the cutting board assembly.
Figure 4B:
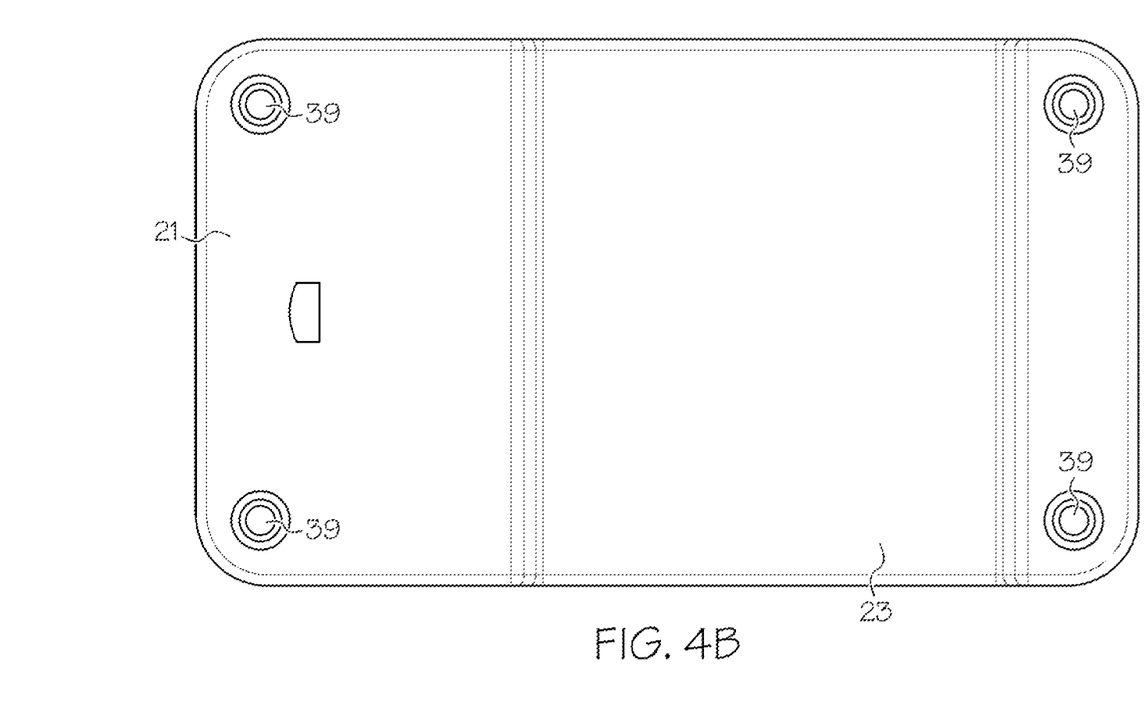

While base tray 3 is illustrated in FIGS. 4A-B as generally rectangular in shape with rounded corners, this is an example embodiment. Other embodiments of base tray 3 may include alternative shapes, wails, floors, etc. different than that illustrated in the figures or described herein. Base tray 3 has a lower bottom surface 21 and an elevated bottom 23. In this embodiment, interior bottom edges 25, 27 extend upward relative to bottom 21, as illustrated so that elevated bottom 23 is elevated from bottom walls 21. Base tray 3 further includes base walls 29 around its perimeter extending vertically upward. In this embodiment, walls 29 are optionally rounded at the corners of base tray 3. Two optional edges 26 of base walls 29 taper downward, in this example embodiment, to lower bottom wall 21 at an open corner 33 of base tray 3. An interior wall 31 spans between two sides of base tray 3, as illustrated, to separate the base tray 3 into two chambers. A first chamber 35 may accept a plurality of cutting mats and/or cutting boards, such as boards 11, 13, 15 when cutting board assembly 1 is not in use.

A second chamber 37 can be used to collect food products from cutting board top 9 or one of the cutting boards 11, 13, 15. Alternatively, chamber 37 may be sized similarly to bin 5 so that bin 5 may be stored and/or used in chamber 37. Later, the collected food products may be slid through an opening in walls 29, such as open corner 33 and out of chamber 37. Bottom areas 39 of base tray 3 may be formed to receive feet 17. In some embodiments, base wall 29 has a lowered region 41 to allow finger access to cutting board top 9 as well as cutting boards 11, 13, 15 so that they may be readily removed from or placed in base tray 3.

Figure 5:
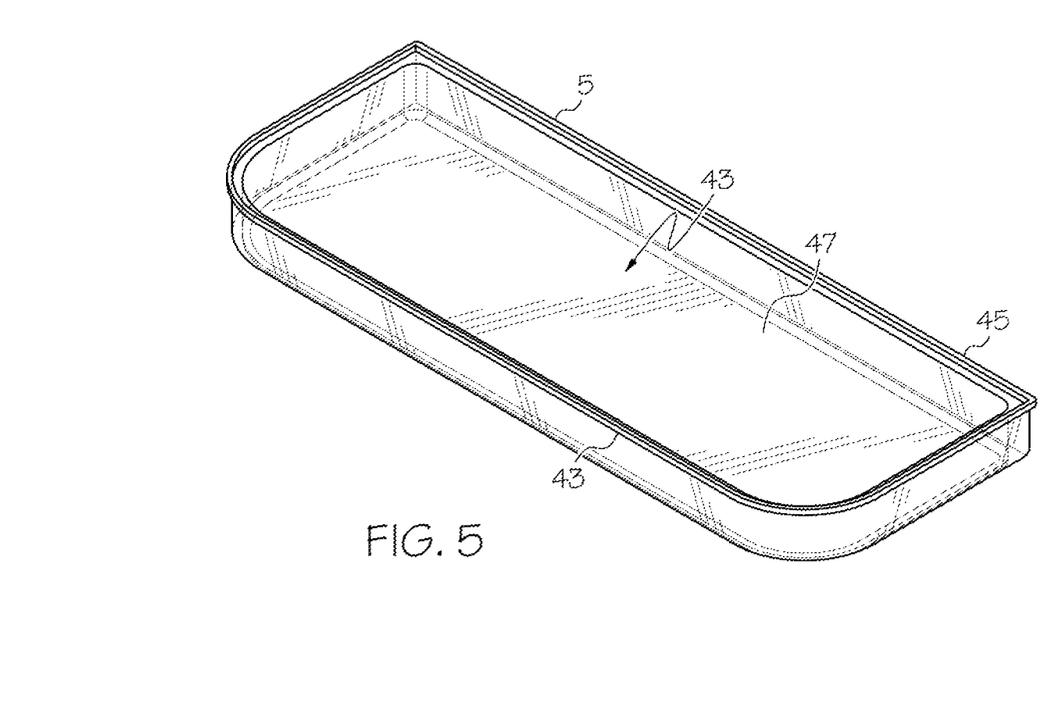
FIG. 5 illustrates a perspective view, a top view of a bin of the cutting board assembly.

As illustrated in FIG. 5, bin 5 is generally rectangular in shape and as mentioned above, formed by way of example with transparent material or a partially transparent material. Those of ordinary skill in the art will appreciate that bin 5 and other components of cutting board assembly 1 may have other/differing shapes, walls, floors, and other features form what is described herein or illustrated in the figures. Bin 5 has a bottom wall 47 as well as vertical bin side walls 45 that form a chamber 43 into which foodstuffs or other desired materials may be placed. Two corners of side walls 45 may be rounded, as illustrated. Bin 5 is shaped to fit within second chamber 37 of base tray 3. Open corner 33 may allow for one-handed removal of bin 5 from base tray 3. Additionally, open corner 33 may allow for the removal of the contents of chamber 37 when bin 5 is not being used.

Figure 6A:
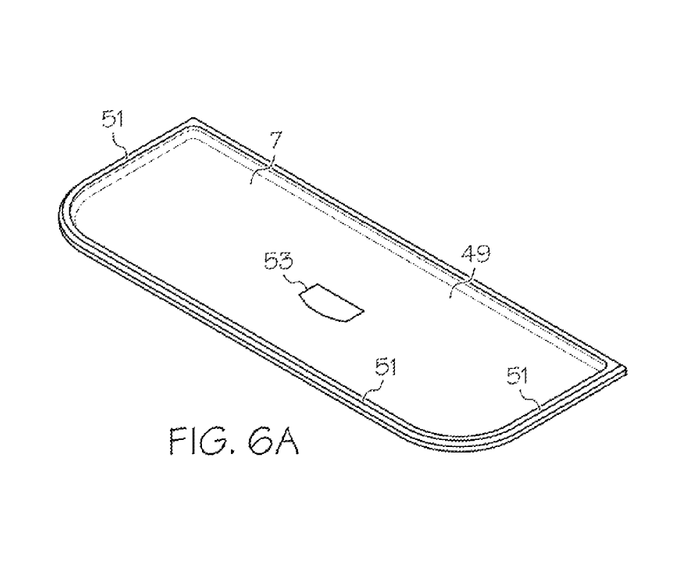
FIGS. 6A-C, respectively, illustrate a perspective view, a side view, and a top view of a lid of the bin.
Figure 6B:
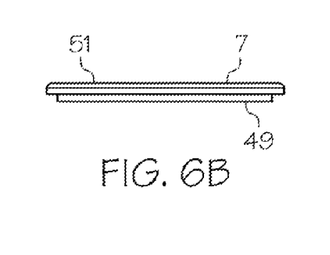
Figure 6C:
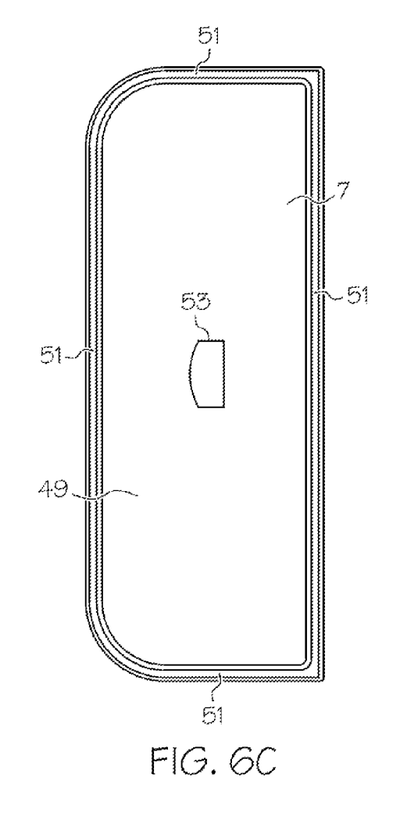

As illustrated in FIGS. 6A-C, lid 7 is formed with a top lid wall 49. As illustrated, an interior region of top lid wall 49 may be recessed below an outer bead of material 51 forming a perimeter of lid 7. Lid wall 49 and outer bead 51 may be formed so that lid 7 may be snugly attached to upper ends of bin side walls 45. A logo 53 may be molded into top lid wall 49 which may also deter a user of cutting board assembly from using lid 7 as a cutting surface that has little support above chamber 47 of bin 5.

Figure 7A:
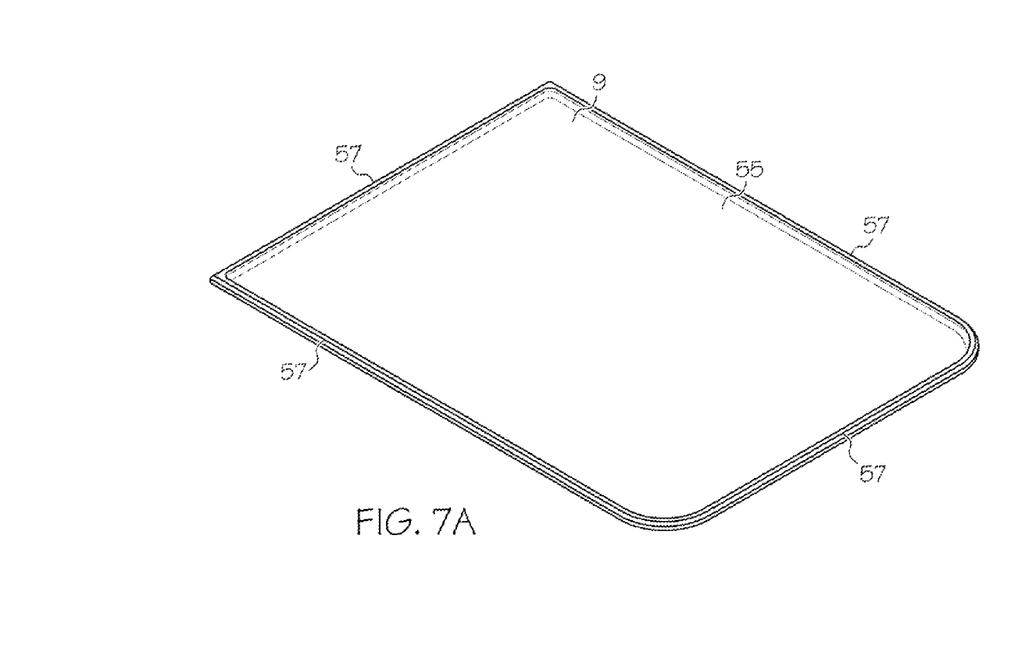
FIGS. 7A-B, respectively, illustrate a perspective view and a side view of a cutting board top of the cutting board assembly.
Figure 7B:
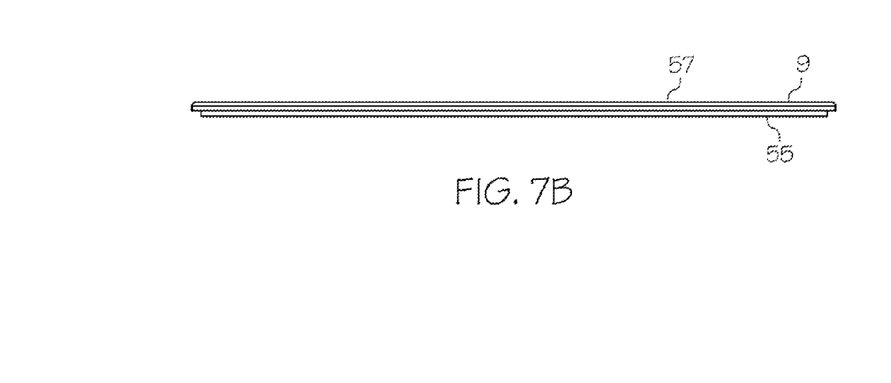

FIGS. 7A-B illustrate cutting board top 9. As illustrated, in one embodiment, cutting board top 9 is generally rectangular in shape and is formed with a flat cutting area 55. Vertical cutting board perimeter walls 57 extend upward around the perimeter of cutting area 55. Together cutting area 55 and cutting board perimeter walls 57 form cutting board top 9 that has a shallow chamber 59 into which one of the cutting boards 11, 13, 15 may be placed. Preferably, cutting board top 9 is made with food grade material that is easily cleaned. Cutting board top 9 can be made with material, as understood by a person of ordinary skill in the art, so that cutting board top 9 is hard enough to withstand the cutting action of knives but not too hard to damage knives.

Figure 8A:
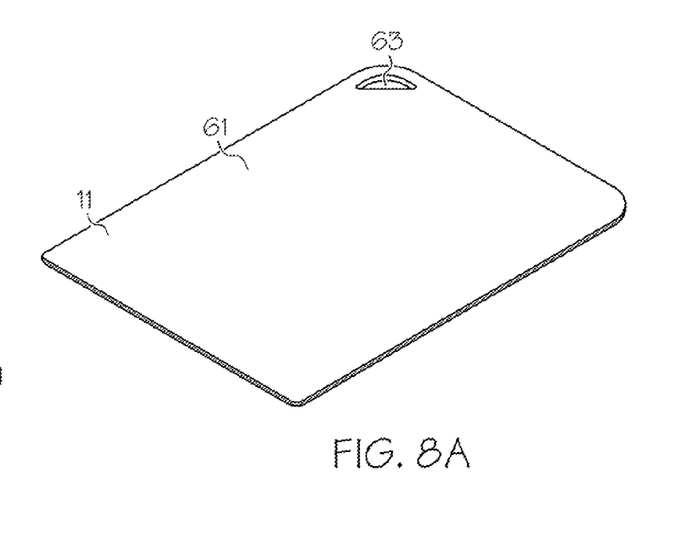
FIGS. 8A-C, respectively, illustrate a perspective view, a side view, and a top view of a cutting board of the cutting board assembly.
Figure 8B:
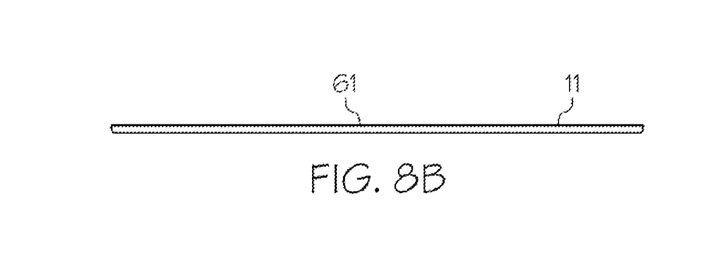
Figure 8C:
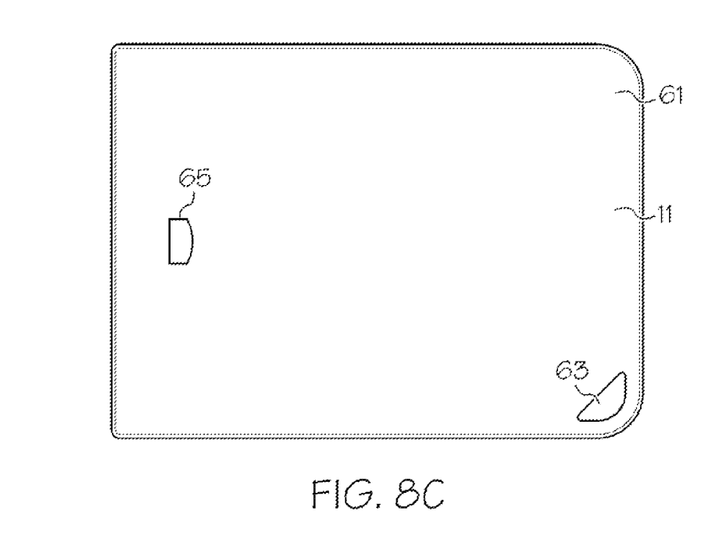

FIGS. 8A-C illustrate cutting board 11. Multiple cutting mats and/or boards 13, 15 may be provided. Cutting mats and/or boards 11, 13, 15 can be made with material, as understood by a person of ordinary skill in the art, so that cutting boards 11, 13, 15 are hard enough to withstand the cutting action of knives but not too hard to damage knives. Cutting boards 11, 13, 15 may each have a color differing from each other. In this example embodiment, cutting board 11 is formed as a planer and generally rectangular sheet 61. In this embodiment, cutting board has two rounded corners and two square corners and is shaped to fit within shallow chamber 59 of cutting board top 9 and into chamber 35 of base tray 3 when not in use. Opening 63 is optionally formed in one of the corners to allow for the easy manipulation of cutting board 11 onto cutting board top 9 and into and out of base tray 3. Preferably, cutting board 11 is made with food grade material that is easily cleaned. In some embodiments, a logo 65 may be formed into cutting board 11.

Figure 9:
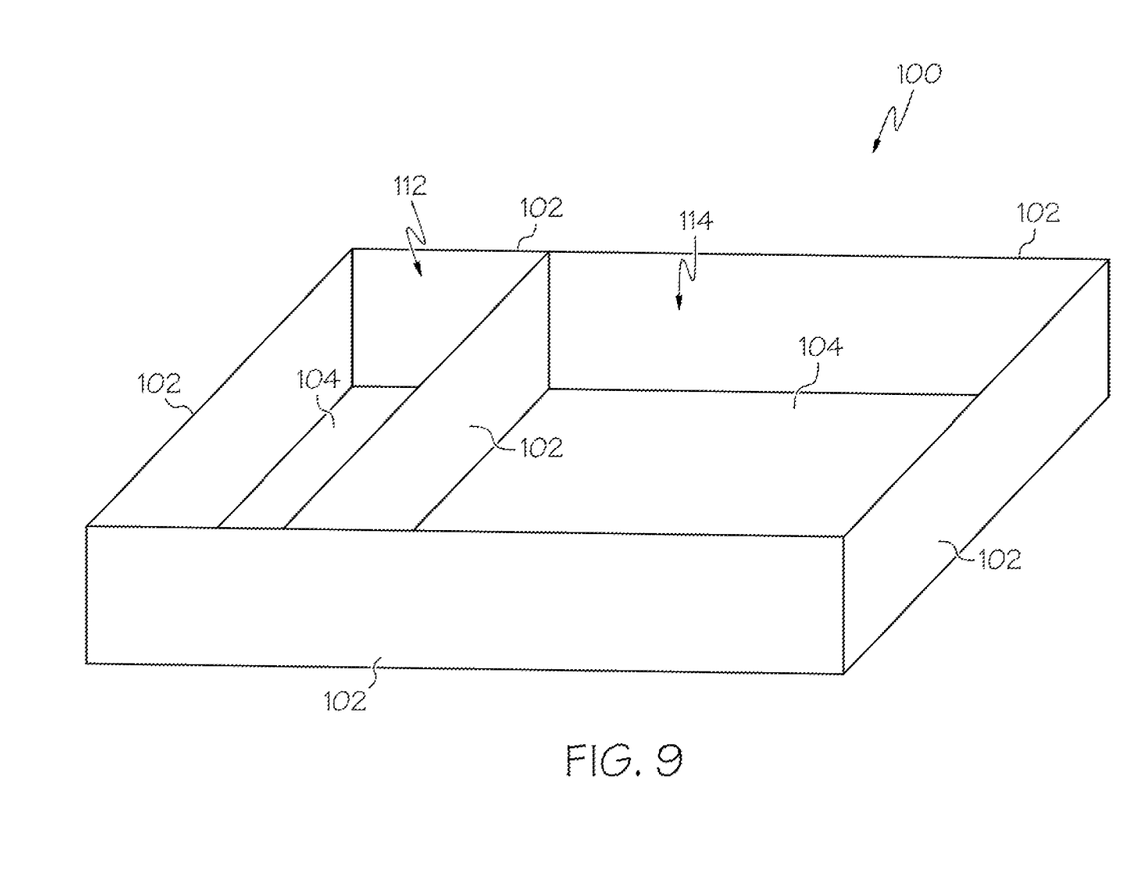
FIG. 9 illustrates a perspective view of another embodiment of a base tray.

FIG. 9 illustrates another embodiment of a base tray 103. Base tray 103 has walls 129, 131 and a bottom floor 121 that form a first chamber 135 and a second chamber 137. First chamber 135 and second chamber 137 have similar functionality to first chamber 35 and second chamber 37 of base tray 3, as discussed herein. First chamber 135 can provide a place to store any number of cutting boards and/or cutting mats. Second chamber 137 can be used to store a bin containing a food-related item and/or used to collect material from a cutting surface.

Having described the components of cutting board assembly 1, its use and operation are now described in more detail as a method. Methods may be better appreciated with reference to flow diagrams. While for purposes of simplicity, explanation of the illustrated methodologies are shown and described as a series of blocks. It is to be appreciated that the methodologies are not limited by the order of the blocks, as some blocks can occur in different orders and/or concurrently with other blocks from that shown and described.

Moreover, less than all the illustrated blocks may be required to implement an example methodology. Blocks may be combined or separated into multiple components. Furthermore, additional and/or alternative methodologies can employ additional, not illustrated blocks.

Figure 10:
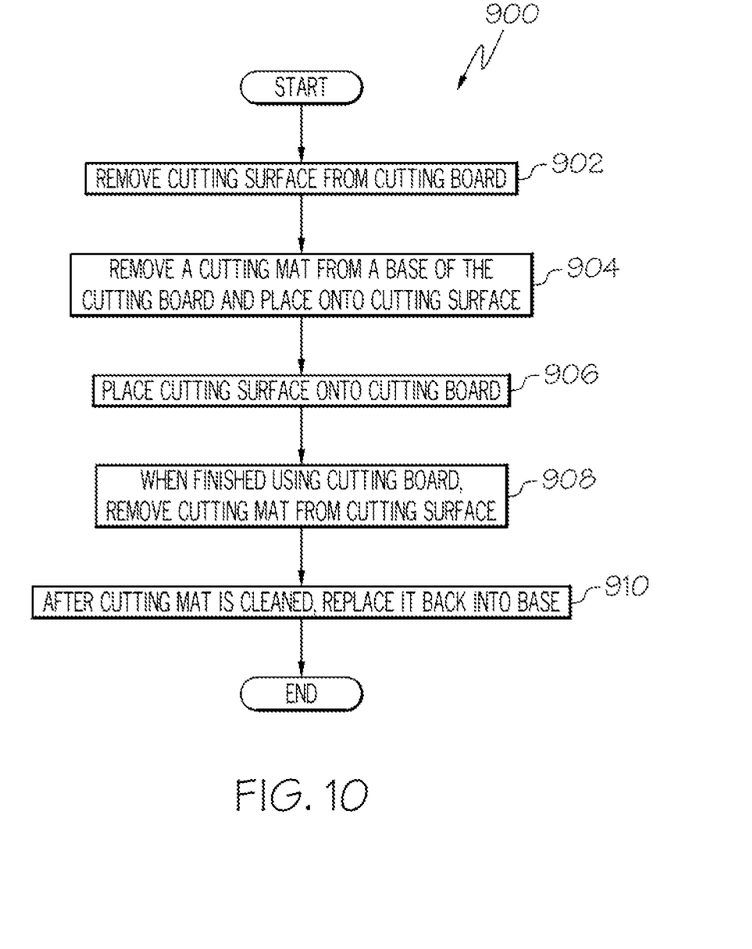
FIG. 10 illustrates an example method of using a cutting board assembly.

FIG. 10 illustrates a method 900 of using cutting board assembly 1. Initially, one would place cutting board assembly 1 where they desired to cut a food material such as meat, fruit, fish, vegetables, etc. Next, he/she would remove cutting board top 11 from cutting board assembly 1 at 902 and remove one of the cutting boards 11, 13, 15 at 904 from inside base tray 3. He/she would place the removed cutting board 11 in the chamber 59 of cutting board top 9 and replace cutting board top 9 onto base tray 3 at 906. He/she then uses cutting board assembly 1 as desired. Lid 7 may be removed from bin 5 and a material in bin 7 may be used. For example, a seasoning stored in bin 5 may be added to material on cutting board 11.

Alternatively, discarded material on cutting board 11 may be moved into bin 5. A user of cutting board assembly 1 has a further option of removing bin 5 from base tray 3 and moving material on cutting board 11 into chamber 37 of base tray 3. Later, this material may be disposed of by emptying material in chamber 37 through open corner 33 of base tray 3. When finished using cutting board 11, cutting board 11 is removed from cutting board top 9 at 908. After cleaning, cutting board 11 is replaced inside base tray 3 under cutting board top 9 at 910.

Alternatively, cutting board 11 may be removed from cutting board top 9 with contents still on it, a fish product, for example, and placed on a countertop together with its contents. Next, a different cutting board 13 may be removed from base tray 3 and placed on cutting board top 9. A different food item, such as a beef product, may be processed on cutting board 13. When needed, cutting board 13 may be removed from cutting board top 9 and placed on a countertop with its beef product. Cutting board 15 may then be removed from base tray 3 and placed on cutting board top 9. A different food item, such as a chicken product, may be processed on cutting board 15. Similar to the other two cutting boards 11, 13, when desired, cutting board 15 may be removed from cutting board top 9 and placed on a countertop with its chicken product. Cutting board 11 with its fish product may be replaced on cutting board top 9 and processing of the fish product can continue. Cutting boards 11, 13, 15 may be placed on and taken off of cutting board top 9 to process different food products on different cutting boards in any order, as needed. The use of several cutting boards prevents the fish product, beef product, and chicken product from becoming mixed together to avoid undesired consequences that may include contamination. Using multiple cutting boards also allows for more efficient food processing because the cutting boards may not need to be washed until food preparation is complete.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on indicate that the embodiment(s) or example(s) so described may include a particular feature, structure, characteristic, property, element, or limitation, but that not every embodiment or example necessarily includes that particular feature, structure, characteristic, property, element, or limitation.

What is claimed is:

1. A cutting board comprising:
   a base tray with walls forming a first chamber and a second chamber;
   a cutting board top with an area for receiving a cutting board adapted to be placed on top of the base tray;
   at least one board adapted to be placed in the first chamber in the base tray and under the cutting board top; and
   a bin adapted to be placed within the second chamber adjacent the cutting board top.

2. A cutting board assembly comprising:
   a base tray having bottom and side walls creating an interior;
   a divider for separating the interior into a primary compartment and a secondary compartment;
   a cutting board top adapted to be placed on top of the base tray to cover the primary compartment; and
   one or more cutting surfaces adapted to be stored in the primary compartment beneath the cutting board top and adapted to optionally be placed on top of the cutting board top when in use, and
   wherein the secondary compartment is adapted to receive a food material moved from the one or more cutting surfaces into the secondary compartment.

3. The cutting board assembly of claim 2, wherein each of the one or more cutting surfaces further comprises:
   a top cuffing surface and a bottom cutting surface.

4. The cutting board assembly of claim 2, further comprising:
   a bin adapted to be placed in the second secondary compartment to receive the food material.

5. The cutting g board assembly of claim 4, wherein the bin further comprises:
   side walls and a bottom forming a bin chamber.

6. The cutting board assembly of claim 4, wherein a portion f the side walls of the base tray form an opening in base tray.

7. The cutting board assembly of claim 6, wherein the bin is at least partially formed with transparent material allowing one to view material in the bin through the opening in the base tray.

8. The cutting board assembly of claim 4, further comprising:
   a lid adapted to be fitted to the bin to cover an upper opening of the bin.

9. The cutting board assembly of claim 8, wherein the lid is adapted to be snap-fitted to the bin.

10. The cutting board assembly of claim 4, wherein the bin is adjacent the cutting board when the cutting board is on top of the base tray covering the primary compartment so that the bin is adapted to receive material swept into the bin from the cutting board top or the one or more cutting surfaces.

11. The cutting board assembly of claim 4, wherein the bin is adapted to store a material associated with the preparation of a food.

12. The cutting board assembly of claim 2, wherein the cutting board top has a cutting surface permitting cutting of food products on the cutting board top.

13. The cutting board assembly of claim 2, wherein the one or re cutting surfaces further comprise:
   a first cutting surface of a first color; and
   a second cutting surface of a second color ha is different than the first color.

14. The cutting board assembly of claim 2, wherein the cutting board assembly is formed with plastic components.

15. The cutting board assembly of claim 2, wherein the base tray is formed with acrylonitrile-butadiene-styrene (ABS) and the cutting board top and the one or more cutting surfaces are formed with polyethylene.

16. The cutting board assembly of claim 2, wherein the cutting board top further comprises:
   a partially recessed area adapted to receive a cutting surface.

17. The cutting board assembly of claim 16, wherein the cutting board top further comprises:
   a flat cutting area; and
   cutting board perimeter walls extending upward form he cutting area and forming the partially recessed area.

18. A method of using a cutting board assembly comprising:
   removing a cutting board top from a base tray of the cutting board assembly;
   removing a cutting surface from ta chamber in the base tray;
   replacing the cutting board top onto the base tray; and
   placing the cutting surface onto the cutting board top.

19. The method of claim 18 wherein the cutting surface is a first cutting surface and further comprising:
   removing the first cutting surface from the cutting board top;
   removing a cutting board top from a base tray of the cutting board assembly;
   removing a cutting surface from ta chamber in the base tray;
   replacing the cutting board top onto the base tray; and
   placing the cutting surface onto the cutting board top.

20. The method of claim 18, further comprising:
   moving a food product from the cutting surface into a bin adjacently located in the base tray next to the cutting board top.

* * * * *

UNITED STATES PATENT AND TRADEMARK OFFICE
CERTIFICATE OF CORRECTION

| | | |
|---|---|---|
| PATENT NO. | : 9,839,328 B2 | |
| APPLICATION NO. | : 14/821292 | |
| DATED | : December 12, 2017 | |
| INVENTOR(S) | : Nathalie Pimentel et al. | |

It is certified that error appears in the above-identified patent and that said Letters Patent is hereby corrected as shown below:

In the Claims

In Claim 3, Column 6, Line 35, please replace "top cuffing surface" with --top cutting surface--.

In Claim 5, Column 6, Line 40, please replace "cutting g board" with --cutting board--.

In Claim 6, Column 6, Lines 44 and 45, please replace "portion f the side walls of the base tray form an opening in base tray" with --portion of the side walls of the base tray form an opening in the base tray--.

In Claim 13, Column 7, Lines 2 to 4, please replace "one or re cutting surfaces further comprise: a first cutting surface of a first color; and a second cutting surface of a second color ha is different" with --one or more cutting surfaces further comprise: a first cutting surface of a first color; and a second cutting surface of a second color that is different--.

In Claim 17, Column 7, Line 19, please replace "upward form he" with --upward from the--.

In Claim 18, Column 8, Line 3, please replace "surface from ta chamber" with --surface from a chamber--.

In Claim 19, Column 8, Line 7, cancel the text beginning with "19. The method of" to and ending "board top." in Column 8, Line 17, and insert the following claim:
--19. The method of claim 18 wherein the cutting surface is a first cutting surface and further comprising:
removing the first cutting surface from the cutting board top; removing the cutting board top from the base tray of the cutting board assembly; removing the cutting surface from the chamber in the base tray; replacing the cutting board top onto the base tray; and placing the cutting surface onto the cutting board top.--.

Signed and Sealed this
Sixth Day of February, 2018

Joseph Matal
*Performing the Functions and Duties of the*
*Under Secretary of Commerce for Intellectual Property and*
*Director of the United States Patent and Trademark Office*